United States Patent
Chiricescu et al.

(10) Patent No.: US 7,969,928 B2
(45) Date of Patent: Jun. 28, 2011

(54) METHOD AND APPARATUS FOR BATTERY-AWARE DYNAMIC BANDWIDTH ALLOCATION FOR WIRELESS SENSOR NETWORKS

(75) Inventors: Silviu Chiricescu, Chicago, IL (US); Ali Saidi, St. Charles, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1001 days.

(21) Appl. No.: 11/681,625

(22) Filed: Mar. 2, 2007

(65) Prior Publication Data

US 2008/0212557 A1 Sep. 4, 2008

(51) Int. Cl.
 *H04B 1/38* (2006.01)
 *G08B 1/08* (2006.01)
 *H04J 3/00* (2006.01)
(52) U.S. Cl. .......... 370/318; 370/345; 340/539.24; 455/73
(58) Field of Classification Search .......... 370/345, 370/331, 318, 395.2–395.43; 340/539, 539.22; 455/73, 450–453
See application file for complete search history.

(56) References Cited

U.S. PATENT DOCUMENTS

| 5,241,542 | A | | 8/1993 | Natarajan et al. |
| 5,974,327 | A | * | 10/1999 | Agrawal et al. ............ 455/452.2 |
| 6,747,976 | B1 | * | 6/2004 | Bensaou et al. ............ 370/395.4 |
| 6,804,738 | B2 | * | 10/2004 | Weber ............................ 710/244 |
| 6,807,159 | B1 | | 10/2004 | Shorey et al. |
| 7,002,470 | B1 | * | 2/2006 | Miao ........................... 340/539.22 |
| 7,031,720 | B2 | * | 4/2006 | Weerakoon et al. ........ 455/452.2 |
| 7,336,168 | B2 | * | 2/2008 | Kates ........................... 340/539.18 |
| 7,684,366 | B2 | * | 3/2010 | Cheng et al. .................... 370/329 |
| 2003/0063585 | A1 | * | 4/2003 | Younis et al. ................... 370/331 |
| 2005/0030921 | A1 | * | 2/2005 | Yau ................................. 370/329 |
| 2006/0025229 | A1 | * | 2/2006 | Mahajan et al. ................ 473/131 |
| 2009/0085769 | A1 | * | 4/2009 | Thubert et al. ............ 340/870.07 |

FOREIGN PATENT DOCUMENTS

KR 1020060063328 A 6/2006
WO 2004098129 A1 11/2004

OTHER PUBLICATIONS

Jun Seok Lee, "PCT International Search Report and Written Opinion," WIPO, ISA/KR, Korean Intellectual Property Office, Daejeon, Republic of Korea, Jun. 25, 2008.
Simin Baharlou, "PCT International Preliminary Report on Patentability," The International Bureau of WIPO, Geneva, Switzerland, Sep. 17, 2009.

* cited by examiner

*Primary Examiner* — Kent Chang
*Assistant Examiner* — Kashif Siddiqui

(57) ABSTRACT

A method and apparatus that allocates bandwidth among wireless sensor nodes in a wireless sensor network (WSN) is disclosed. The method may include allocating transmission time slots for a plurality of wireless sensor nodes based on at least one channel quality metric, determining battery levels in each of the plurality of wireless sensor nodes and average battery level of all of the plurality of wireless sensor nodes, determining differences in battery level between each of the plurality of wireless sensor nodes and average battery level of all of the plurality of wireless sensor nodes, wherein if any such difference is above a predetermined threshold, increasing the transmission time slots allocation of wireless sensor nodes having higher battery levels relative to other wireless sensor nodes in the plurality of wireless sensor nodes.

20 Claims, 4 Drawing Sheets

| $T_0$ | B | 1 | 1 | 1 | 1 | 1 | 2 | 2 | 2 | 2 | B | 1 | 1 | 1 | 1 | 1 | 1 | 2 | 2 | 2 |
|---|---|---|---|---|---|---|---|---|---|---|---|---|---|---|---|---|---|---|---|---|
| $T_1$ | B | 1 | 1 | 1 | 1 | 1 | 1 | 2 | 2 | B | 1 | 1 | 1 | 1 | 1 | 2 | 2 | 2 | | |

. . .

| $T_d$ | B | 1 | 1 | 1 | 2 | 2 | 2 | 2* | 2* | 2* | B | 1 | 1 | 2 | 2 | 2 | 2 | 2* | 2* | 2* |
|---|---|---|---|---|---|---|---|---|---|---|---|---|---|---|---|---|---|---|---|---|

. . .

| $T_{2d}$ | B | 1 | 1 | 1 | 1 | 2 | 2 | 2 | 2 | B | 1 | 1 | 1 | 1 | 2 | 2 | 2 | | | |
|---|---|---|---|---|---|---|---|---|---|---|---|---|---|---|---|---|---|---|---|---|

FIG. 4

METHOD AND APPARATUS FOR BATTERY-AWARE DYNAMIC BANDWIDTH ALLOCATION FOR WIRELESS SENSOR NETWORKS

BACKGROUND OF THE INVENTION

1. Field of the Invention

The invention relates to wireless communication networks, and in particular, wireless sensor networks.

2. Introduction

In many wireless sensor networks (WSNs) with star topology, all the wireless sensor nodes except the coordinator are battery powered. The lifetime of such a network is given by the lifetime of the wireless sensor nodes. There are two possible scenarios: (1) the network "dies" when the last wireless sensor node in the network "dies", and (2) the network "dies" when the first wireless sensor node in the network dies. Maximizing the average capacity of a network described in the first scenario is a trivial exercise. Employing a "winner takes all" approach, the coordinator allocates all the available time slots to the wireless sensor node that has the best channel capacity.

However, doing the same for a network considered in the second scenario is a complicated joint optimization problem. On one hand, the wireless sensor nodes which have good channel capacity should be allocated as many time slots as possible. However, doing so would disproportionally drain the battery of those nodes. Therefore, it is desirable that all the wireless sensor nodes in the network "die" at the same time. If this goal is not achieved, then energy resources in the network are underutilized (i.e. there are nodes which can still transmit).

SUMMARY OF THE INVENTION

A method and apparatus that allocates bandwidth among wireless sensor nodes in a wireless sensor network (WSN) is disclosed. The method may include allocating transmission time slots for a plurality of wireless sensor nodes based on at least one channel quality metric, determining battery levels in each of the plurality of wireless sensor nodes and average battery level of all of the plurality of wireless sensor nodes, determining differences in battery level between each of the plurality of wireless sensor nodes and average battery level of all of the plurality of wireless sensor nodes, wherein if any such difference is above a predetermined threshold, increasing the transmission time slots allocation of wireless sensor nodes having higher battery levels relative to other wireless sensor nodes in the plurality of wireless sensor nodes.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is an exemplary diagram illustrating time slot allocation in accordance with a possible embodiment of the invention.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

The invention concerns how to maximize the average network capacity subject to also maximizing the lifetime of the network (i.e. all the wireless sensor nodes "die" at approximately the same time). In particular, the invention concerns the use of a channel quality metric and actual battery level of the nodes to maximize the average network capacity.

Figure 1:
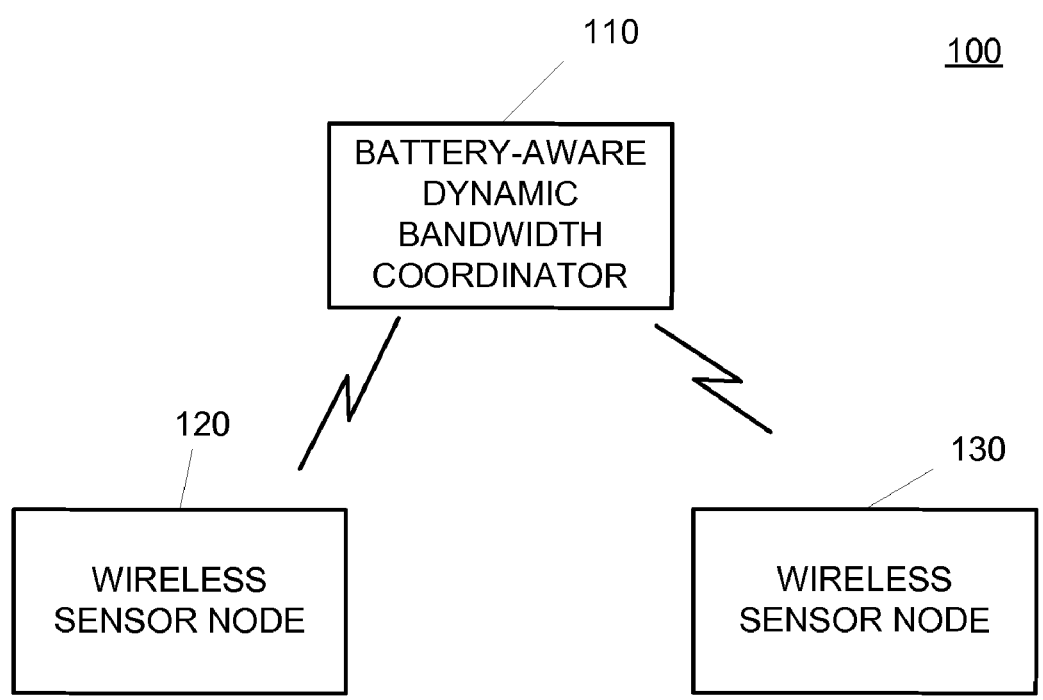
FIG. 1 illustrates an exemplary diagram of a wireless sensor network in accordance with a possible embodiment of the invention.

FIG. 1 illustrates an exemplary diagram of a wireless sensor network (WSN) 100 in accordance with a possible embodiment of the invention. In particular, the WSN 100 may include a battery-aware dynamic bandwidth coordinator 110, and wireless sensor nodes 120, 130. The battery-aware dynamic bandwidth coordinator 110 may also be a node in the WSN 100. However, the battery-aware dynamic bandwidth coordinator 110 serves to allocate transmission times of the various wireless sensor nodes 120, 130 in the WSN 100. While FIG. 1 only shows two wireless sensor nodes 120, 130, this example is for ease of discussion as one of skill in the art may appreciate that more than two wireless sensor nodes (or a plurality of wireless sensor nodes) may exist in the WSN 100.

The battery-aware dynamic bandwidth coordinator 110 and wireless sensor nodes 120, 130 may represent or be part of an electronic battery-operated device in the WSN 100. For example, the battery-aware dynamic bandwidth coordinator 110 and wireless sensor nodes 120, 130 may represent a mobile communication device. The mobile in a communication device may be a portable MP3 player, satellite radio receiver, AM/FM radio receiver, satellite television, iPod, portable laptop, portable computer, wireless radio, wireless telephone, portable digital video recorder, cellular telephone, mobile telephone, or personal digital assistant (PDA), for example.

The WSN 100 may allow wireless sensor nodes 120, 130 to communicate with other wireless sensor nodes 120, 130, as well as the battery-aware dynamic bandwidth coordinator 110.

Figure 2:
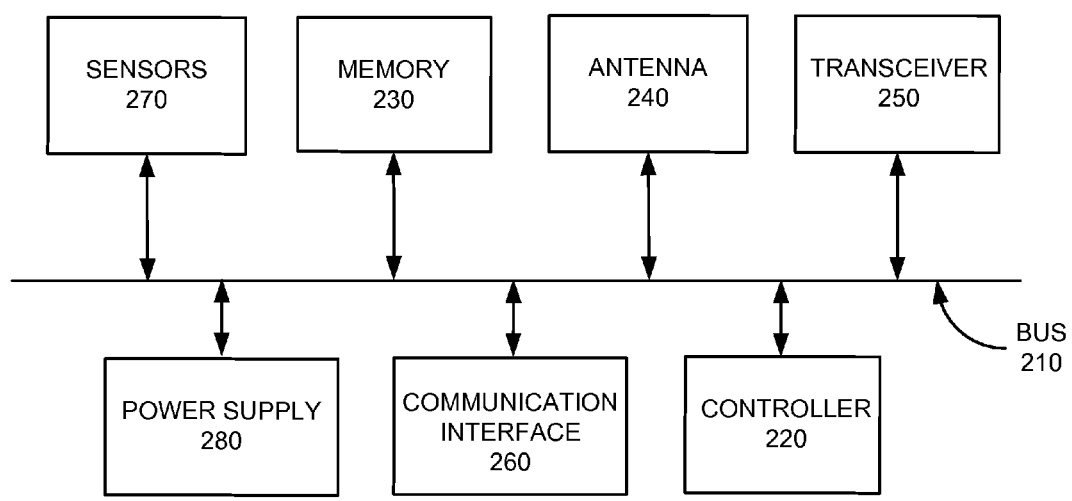
FIG. 2 illustrates a block diagram of an exemplary battery-aware dynamic bandwidth coordinator/wireless sensor node in accordance with a possible embodiment of the invention.

FIG. 2 illustrates a block diagram of either an exemplary battery-aware dynamic bandwidth coordinator 110/an exemplary wireless sensor node 120, 130 in accordance with a possible embodiment of the invention. Since the battery-aware dynamic bandwidth coordinator 110 is also a wireless sensor node in the WSN 100, the exemplary structure shown in FIG. 2 may apply to both an exemplary battery-aware dynamic bandwidth coordinator 110 and an exemplary wireless sensor node 120, 130. For ease of discussion, we will refer to the exemplary structure shown in FIG. 2 as a battery-aware dynamic bandwidth coordinator 110.

The battery-aware dynamic bandwidth coordinator 110 may include a bus 210, a controller 220, a memory 230, an antenna 240, a transceiver 250, a communication interface 260, sensors 270, and a power supply 280. Bus 210 may permit communication among the components of the battery-aware dynamic bandwidth coordinator 110.

Controller 220 may include at least one conventional processor or microprocessor that interprets and executes instructions. Memory 230 may be a random access memory (RAM) or another type of dynamic storage device that stores information and instructions for execution by controller 220. Memory 230 may also include a read-only memory (ROM) which may include a conventional ROM device or another type of static storage device that stores static information and instructions for controller 220.

Transceiver 250 may include one or more transmitters and receivers. The transceiver 250 may include sufficient functionality to interface with any network or communications station and may be defined by hardware or software in any manner known to one of skill in the art. The controller 220 is cooperatively operable with the transceiver 250 to support operations within the WSN 100. The transceiver 250 transmits and receives transmissions via the antenna 240 in a manner known to those of skill in the art.

Communication interface 260 may include any mechanism that facilitates communication via the WSN 100. For example, communication interface 260 may include a modem. Alternatively, communication interface 260 may include other mechanisms for assisting the transceiver 250 in communicating with other devices and/or systems via wireless connections.

Sensors 270 may include one or more sensors which detect, read, sense, etc. temperature, pressure, humidity, motion, vibration, sound, etc., for example. The information generated from sensors 270 may be stored in memory 230 and/or transmitted by transceiver 250 to another wireless sensor node 120, 130, another network device, or the battery-aware dynamic bandwidth coordinator 110 (if the sensors 270 reside on a wireless sensor node other than the battery-aware dynamic bandwidth coordinator 110).

In the case of the battery-aware dynamic bandwidth coordinator 110, the power supply 280 may represent either a DC (e.g., battery) or AC power supply as the battery-aware dynamic bandwidth coordinator 110 may be either DC or AC powered. However, with respect to wireless sensor nodes 120, 130, the power supply 280 may represent a DC power source, such as a battery.

The battery-aware dynamic bandwidth coordinator 110 may perform such functions in response to controller 220 by executing sequences of instructions contained in a computer-readable medium, such as, for example, memory 230. Such instructions may be read into memory 230 from another computer-readable medium, such as a storage device or from a separate device via communication interface 260.

The WSN 100 and the battery-aware dynamic bandwidth coordinator 110 illustrated in FIGS. 1-2 and the related discussion are intended to provide a brief, general description of a suitable computing environment in which the invention may be implemented. Although not required, the invention will be described, at least in part, in the general context of computer-executable instructions, such as program modules, being executed by the battery-aware dynamic bandwidth coordinator 110. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations which operate off of batteries, including cellular devices, mobile communication devices, portable computers, hand-held devices, portable multi-processor systems, microprocessor-based or programmable consumer electronics, and the like.

For illustrative purposes, the battery-aware dynamic bandwidth coordination process will be described below in relation to the block diagrams shown in FIGS. 1 and 2.

Figure 3:
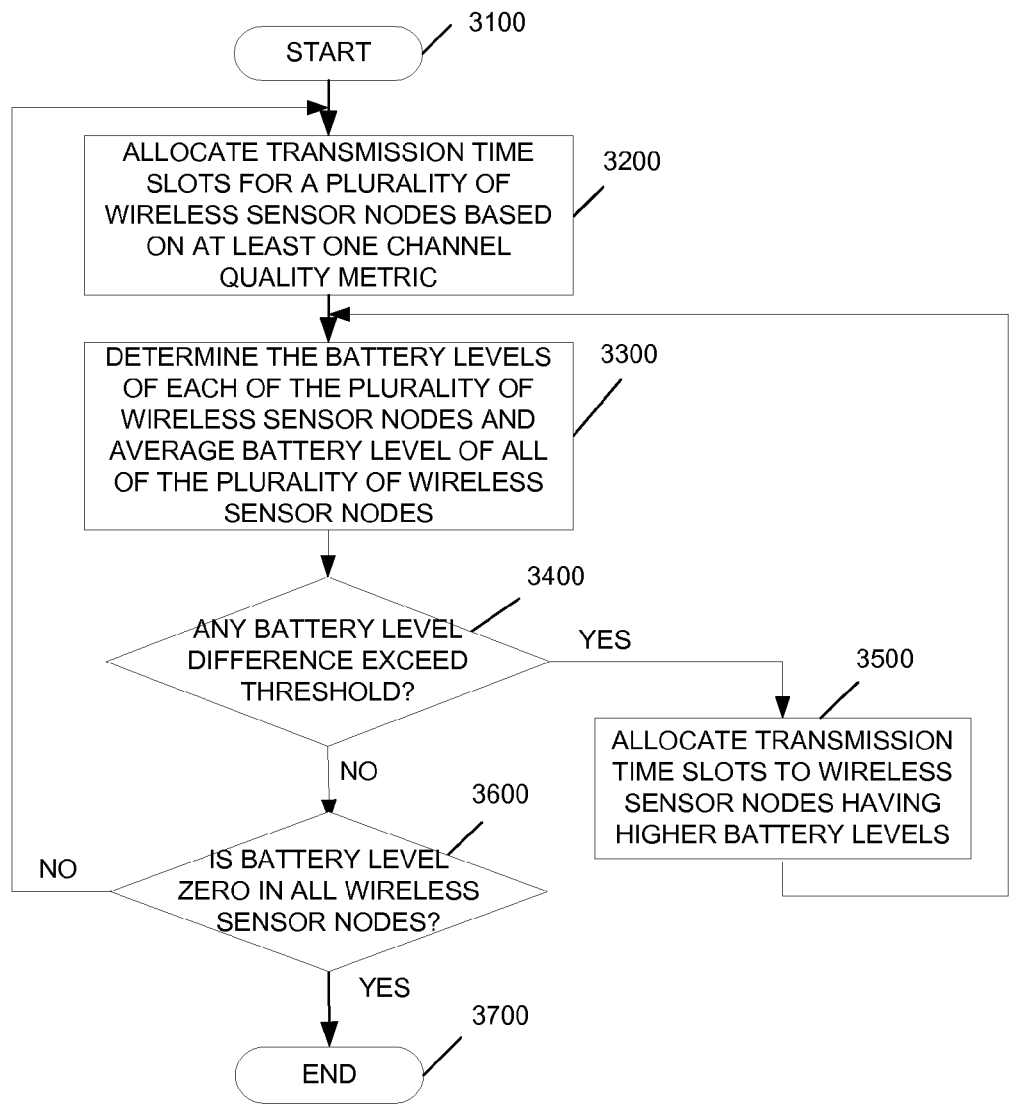
FIG. 3 is an exemplary flowchart illustrating one possible battery-aware dynamic bandwidth coordination process in accordance with one possible embodiment of the invention.

FIG. 3 is an exemplary flowchart illustrating some of the basic steps associated with a battery-aware dynamic bandwidth coordination process in accordance with a possible embodiment of the invention. The process begins at step 3100 and continues to step 3200 where the battery-aware dynamic bandwidth coordinator 110 allocates transmission time slots for a plurality of wireless sensor nodes 120, 130 based on at least one channel quality metric. Many of the modern low-power radios, for example, provide a measure of the quality of the communication channel. Two examples of measures of channel quality are the relative signal strength indicator (RSSI) and link quality indicator (LQI). Several studies have shown that LQI is highly correlated with the packet error rate (PER). Thus, to avoid the additional overhead of obtaining channel quality values, LQI may be used as the channel quality metric.

At step 3300, the battery-aware dynamic bandwidth coordinator 110 determines the battery levels of each of the plurality of the wireless sensor nodes and average battery level of all of the plurality of wireless sensor nodes. The actual battery level (or capacity) may be defined as the amount of charge the battery delivers under given load and temperature conditions. The invention is independent of the battery type and/or model. The average battery level of all of the plurality of wireless sensor nodes is the total of all of the battery levels of the wireless sensor nodes divided by the total number of nodes in the WSN 100.

At step 3400, the battery-aware dynamic bandwidth coordinator 110 determines if any difference in battery levels between wireless sensor nodes 120, 130 and average battery level of all of the plurality of wireless sensor nodes in the WSN 100 exceeds a threshold. The threshold may be predetermined, based on lookup table, determined by a process according to environmental conditions, etc.

For example, assume that the battery level BL for wireless sensor nodes $N_1$ and $N_2$ are $BL_1$ and $BL_2$, respectively. If $|BL_1-BL_2| \leq e$, then the wireless sensor nodes will be in an "equilibrium" state and the battery-aware dynamic bandwidth coordinator 110 will dynamically allocate time slots proportionally to the channel quality of the nodes.

If the battery-aware dynamic bandwidth coordinator 110 determines that any of the battery level differences between wireless sensor nodes 120, 130 and average battery level of all of the plurality of wireless sensor nodes exceed the threshold, then at step 3500, battery-aware dynamic bandwidth coordinator 110 increases the transmission time slot allocation of wireless sensor nodes 120, 130 having higher battery levels. The process then returns to step 3300 immediately, or after a delay period, for example.

Thus, using the above two-node example, if $|BL_1-BL_2|>e$, the battery-aware dynamic bandwidth coordinator 110 will allocate more transmission time slots to a wireless sensor node 120, 130 that has a higher battery level. This preferential treatment will be employed until the two wireless sensor nodes 120, 130 will again have their battery levels within e of each other.

Stated it differently, this time slot adjustment will be done over a period of time that approximates similar average channel quality for both nodes. As a result, both nodes will have, on average, approximately the same number of time slots allocated to each, and hence they will run out of battery at about the same time.

Mathematically, the number of time slots allocated to each node, $NS_i$, can be expressed as Equation (1.0), below:

$$NS_i = \begin{cases} \alpha + (NTS - \alpha) * \left\lfloor \dfrac{LQI_i}{\sum_{k=i}^{2} LQI_k} \right\rfloor & \text{if } BL_i > BL_j \\ (NTS - \alpha) * \left\lfloor \dfrac{LQI_i}{\sum_{k=i}^{2} LQI_k} \right\rfloor & \text{if } BL_i \leq BL_j \end{cases} \quad (1.0)$$

where NTS is total number of time slots in a super-frame, and $\alpha$ is a parameter which is adjusted based on the $|BL_1-BL_2|$ value. If $|BL_1-BL_2| \leq e$, then $\alpha=0$.

In the general case where there are N nodes in our battery-aware dynamic bandwidth allocation, the battery level of each node is compared to the average battery level of the N nodes $$\left(\text{i.e. } BL_{avg} = \frac{1}{N} \sum_{j=1}^{N} BL_j\right).$$

The nodes, $N_k$, whose battery level differences are greater than a threshold, e, will be allocated a fixed number of time slots, $\alpha_k$. The remaining time-slots will then be allocated to the nodes according to Equation 1.1, below:

$$NS_i = \begin{cases} \alpha_i + \left(NTS - \sum_k \alpha_k\right) * \left\lfloor \dfrac{LQI_i}{\sum_{j=1}^{N} LQI_j} \right\rfloor & \text{if } BL_i - BL_{avg} \geq e \\ \left(NTS - \sum_k \alpha_k\right) * \left\lfloor \dfrac{LQI_i}{\sum_{j=1}^{N} LQI_j} \right\rfloor & \text{if } BL_i - BL_{avg} < e \end{cases} \quad (1.1)$$

If at step 3400, the battery-aware dynamic bandwidth coordinator 110 determines that the battery level differences do not exceed the threshold, the battery-aware dynamic bandwidth coordinator 110 proceeds to step 3600 where the battery-aware dynamic bandwidth coordinator 110 determines whether the battery level is zero for all wireless sensor nodes in the WSN 100.

If the battery-aware dynamic bandwidth coordinator 110 determines that the battery level in all the wireless sensor nodes is not zero (or "effectively" not zero), the process returns to step 3200 where battery-aware dynamic bandwidth coordinator 110 allocates transmission time slots for the plurality of wireless sensor nodes based on the channel quality metric.

If at step 3600, the battery-aware dynamic bandwidth coordinator 110 determines that the battery level is zero (or effectively zero) in all wireless sensor nodes 120, 130 in the WSN 100 (i.e., the network has "died"), the process goes to step 3700, and ends. Note that a node "dies" when its battery cannot support its normal operation. Therefore, as indicated above, while the battery level may not be exactly zero, it may be effectively zero when its battery can no longer support the node's normal operation.

FIG. 4 illustrates the time slot allocation process according to the exemplary process discussed above in relation to FIG. 3. From time $T_0$ to time $T_d-1$, the battery-aware dynamic bandwidth coordinator 110 allocates time slots for the two wireless sensor nodes 120, 130 proportional to their LQI values (parameter $\alpha$ in the equation above is zero). Because node $N_1$ has a better channel quality, the battery-aware dynamic bandwidth coordinator 110 allocates $N_1$ more transmission time slots. As a result, its battery level goes down more rapidly then the battery level of node $N_2$.

At time $T_d$, the battery-aware dynamic bandwidth coordinator 110 evaluates the battery level of the two wireless sensor nodes 120, 130. Since $|BL_1-BL_2|>e$, for the next super-frames, wireless sensor node $N_2$ will be guaranteed a fixed number of time slots (2* in FIG. 4) in addition to the ones the battery-aware dynamic bandwidth coordinator 110 allocated to $N_2$ that are dynamically proportional to its channel quality.

After another $T_d$ period, the battery-aware dynamic bandwidth coordinator 110 again evaluates the battery level of the wireless sensor nodes 120, 130, and since the battery levels are within e of each other, the battery-aware dynamic bandwidth coordinator 110 again allocates time slots to the wireless sensor nodes 120, 130 proportionally to their LQI values.

The process can dynamically adjust the period over which the battery level is adjusted. This means that the overhead of the battery estimation model is amortized over a dynamically variable number (usually large) of super-frames.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the battery-aware dynamic bandwidth coordinator 110 in FIGS. 1 and 2 each processing the content in various possible ways. It does not necessarily need to be one system used by all end users. Accordingly, the appended claims and their legal equivalents should only define the invention, rather than any specific examples given.

We claim:

1. A method for allocating bandwidth among wireless sensor nodes in a wireless sensor network, the method comprising:
   allocating a portion of transmission time slots for a plurality of wireless sensor nodes based on at least one channel quality metric;
   determining battery levels in each of the plurality of wireless sensor nodes and average battery level of all of the plurality of wireless sensor nodes;
   allocating a remaining portion of transmission time slots for the plurality of wireless sensor nodes based on the determined battery levels; and
   determining differences between the battery levels of each of the plurality of wireless sensor nodes and the average battery level of all of the plurality of wireless sensor nodes, wherein if any such difference is above a predetermined threshold increasing the transmission time slots allocation of wireless sensor nodes having higher battery levels relative to other wireless sensor nodes in the plurality of wireless sensor nodes.

2. The method of claim 1 wherein if any difference in battery levels is not above a predetermined threshold, then allocating transmission time slots for a plurality of wireless sensor nodes based on at least one channel quality metric.

3. The method of claim 1 wherein the at least one channel quality metric is at least one of a link quality indicator and a relative signal strength indicator.

4. The method of claim 1 wherein the difference between the battery levels of each of the plurality of wireless sensor nodes and the average battery level of all of the plurality of wireless sensor nodes is determined at predetermined times.

5. The method of claim 1 wherein one of the plurality of wireless sensor nodes serves as a battery-aware dynamic bandwidth coordinator and allocates transmission time slots to the other wireless sensor nodes in the wireless sensor network.

6. The method of claim 1 wherein each of the plurality of wireless sensor nodes transmits sensor information, the sensor information being at least one of temperature, pressure, humidity, motion, vibration, and sound.

7. The method of claim 1 wherein each of the plurality of wireless sensor nodes is part of a mobile communication device, the mobile communication device being one of a portable MP3 player, satellite radio receiver, AM/FM radio receiver, satellite television, iPod, portable laptop, portable computer, wireless radio, wireless telephone, portable digital video recorder, cellular telephone, mobile telephone, and personal digital assistant.

8. An apparatus that allocates bandwidth among wireless sensor nodes in a wireless sensor network, the apparatus comprising:
   one or more sensors that sense environmental conditions;
   a transceiver that transmits sensor information related to the sensed environmental conditions using transmission time slots; and
   a controller that allocates a portion of the transmission time slots for a plurality of wireless sensor nodes based on at least one channel quality metric, determines battery levels in each of the plurality of wireless sensor nodes and average battery level of all of the plurality of wireless sensor nodes, allocates a remaining portion of transmission time slots for the plurality of wireless sensor nodes based on the determined battery levels, and determines the difference between the battery levels of each of the plurality of wireless sensor nodes and the average battery level of all of the plurality of wireless sensor nodes, wherein if any such difference is above a predetermined threshold, the controller increases the transmission time slot allocation of wireless sensor nodes having higher battery levels relative to other wireless sensor nodes in the plurality of wireless sensor nodes.

9. The apparatus of claim 8 wherein if any difference in battery levels is not above a predetermined threshold, then the controller allocates transmission time slots for a plurality of wireless sensor nodes based on at least one channel quality metric.

10. The apparatus of claim 8 wherein the at least one channel quality metric is at least one of a link quality indicator and a relative signal strength indicator.

11. The apparatus of claim 8 wherein the controller determines the difference between the battery levels of each of the plurality of wireless sensor nodes and the average battery level of all of the plurality of wireless sensor nodes at predetermined times.

12. The apparatus of claim 8 wherein the apparatus serves as a battery-aware dynamic bandwidth coordinator which allocates transmission time slots to the other wireless sensor nodes in the wireless sensor network.

13. The apparatus of claim 8 wherein the transmitted sensor information is related to at least one of temperature, pressure, humidity, motion, vibration, and sound.

14. The apparatus of claim 8 wherein the apparatus is part of a mobile communication device, the mobile communication device being one of a portable MP3 player, satellite radio receiver, AM/FM radio receiver, satellite television, iPod, portable laptop, portable computer, wireless radio, wireless telephone, portable digital video recorder, cellular telephone, mobile telephone, and personal digital assistant.

15. A mobile communication device comprising:
   one or more sensors that sense environmental conditions;
   a transceiver that transmits sensor information related to the sensed environmental conditions using transmission time slots; and
   a controller that allocates a portion of the transmission time slots for a plurality of wireless sensor nodes based on at least one channel quality metric, determines battery levels in each of the plurality of wireless sensor nodes and average battery level of all of the plurality of wireless sensor nodes, allocates a remaining portion of transmission time slots for the plurality of wireless sensor nodes based on the determined battery levels, and determines the difference between the battery levels of each of the plurality of wireless sensor nodes and the average battery level of all of the plurality of wireless sensor nodes, wherein if any such difference is above a predetermined threshold, the controller increases the transmission time slot allocation of wireless sensor nodes having higher battery levels relative to other wireless sensor nodes in the plurality of wireless sensor nodes.

16. The mobile communication device of claim 15 wherein if any difference in battery levels is not above a predetermined threshold, then the controller allocates transmission time slots for a plurality of wireless sensor nodes based on at least one channel quality metric.

17. The mobile communication device of claim 15 wherein the at least one channel quality metric is at least one of a link quality indicator and a relative signal strength indicator.

18. The mobile communication device of claim 15 wherein the controller determines the difference between the battery levels of each of the plurality of wireless sensor nodes and the average battery level of all of the plurality of wireless sensor nodes at predetermined times.

19. The mobile communication device of claim 15 wherein the transmitted sensor information is related to at least one of temperature, pressure, humidity, motion, vibration, and sound.

20. The mobile communication device of claim 15 wherein the mobile communication device is one of a portable MP3 player, satellite radio receiver, AM/FM radio receiver, satellite television, iPod, portable laptop, portable computer, wireless radio, wireless telephone, portable digital video recorder, cellular telephone, mobile telephone, and personal digital assistant.

* * * * *

UNITED STATES PATENT AND TRADEMARK OFFICE
CERTIFICATE OF CORRECTION

PATENT NO. : 7,969,928 B2
APPLICATION NO. : 11/681625
DATED : June 28, 2011
INVENTOR(S) : Silviu Chiricescu et al.

It is certified that error appears in the above-identified patent and that said Letters Patent is hereby corrected as shown below:

Delete Drawing Sheet 4 of 4 and substitute therefore the attached Drawing Sheet 4 of 4 consisting of corrected FIG. 4.

Signed and Sealed this
Fifteenth Day of January, 2013

David J. Kappos
*Director of the United States Patent and Trademark Office*

| | | | | | | | | | | | | | | | | | | | |
|---|---|---|---|---|---|---|---|---|---|---|---|---|---|---|---|---|---|---|---|
| $T_0$ | B | 1 | 1 | 1 | 1 | 1 | 2 | 2 | 2 | 2 | B | 1 | 1 | 1 | 1 | 1 | 1 | 2 | 2 | 2 |
| $T_1$ | B | 1 | 1 | 1 | 1 | 1 | 1 | 1 | 2 | 2 | B | 1 | 1 | 1 | 1 | 1 | 1 | 2 | 2 | 2 |
| ⋮ | | | | | | | | | | | | | | | | | | | | |
| $T_d$ | B | 1 | 1 | 1 | 2 | 2 | 2 | 2* | 2* | 2* | B | 1 | 1 | 2 | 2 | 2 | 2 | 2* | 2* | 2* |
| ⋮ | | | | | | | | | | | | | | | | | | | | |
| $T_{2d}$ | B | 1 | 1 | 1 | 1 | 1 | 2 | 2 | 2 | 2 | B | 1 | 1 | 1 | 1 | 1 | 1 | 2 | 2 | 2 |

FIG. 4